United States Patent
Tomioka et al.

[19]

[11] Patent Number: 6,139,175
[45] Date of Patent: Oct. 31, 2000

[54] LIGHT SOURCE FOR ENDOSCOPES, HAVING DIFFERENT NUMERICAL-APERTURE LIGHT COLLECTION SYSTEM

[75] Inventors: Makoto Tomioka, Hachioji; Akira Hasegawa, Machida; Takayuki Suzuki, Hachioji; Yumi Ikeda, Fuchu, all of Japan

[73] Assignee: Olympus Optical Co., Ltd., Tokyo, Japan

[21] Appl. No.: 09/395,743

[22] Filed: Sep. 14, 1999

Related U.S. Application Data

[62] Division of application No. 08/854,944, May 14, 1997.

[30] Foreign Application Priority Data

May 15, 1996 [JP] Japan .................................. 8-120525

[51] Int. Cl.⁷ ..................................................... A61B 1/06
[52] U.S. Cl. ......................... 362/574; 362/572; 362/573; 362/268
[58] Field of Search ..................................... 362/551, 572, 362/574, 573, 268, 804, 558, 327, 328, 331

[56] References Cited

U.S. PATENT DOCUMENTS

| | | |
|---|---|---|
| 4,953,937 | 9/1990 | Kikuchi et al. . |
| 5,143,435 | 9/1992 | Kikuchi .................................. 362/574 |
| 5,509,095 | 4/1996 | Baker et al. . |
| 5,560,699 | 10/1996 | Davenport et al. . |
| 5,707,131 | 1/1998 | Li . |
| 5,746,494 | 5/1998 | Koeda et al. . |

Primary Examiner—Sandra O'Shea
Assistant Examiner—Ismael Negron
Attorney, Agent, or Firm—Pillsbury Madison & Sutro LLP

[57] ABSTRACT

A light source device for endoscopes includes a light source; a condenser lens unit for collecting light beams from the light source; a light guide for receiving the light beams collected through the condenser lens unit into its entrance end face to transmit them to its exit end face; and a reflecting mirror located on the opposite side of the condenser lens unit with respect to the light source. The light source device is designed so that a position where the light beams emitted from the light source are collected directly through the condenser lens unit does not coincide with a position where the light beams emitted from the light source and reflected back to the light source by the reflecting mirror are collected through the condenser lens unit. In an embodiment, an arc axis of the light source is substantially parallel to the optical axis of the condenser lens unit. In another embodiment, direct light and reflected light each enter an entrance face of a forked light guide. In another embodiment, an infra-red removing filter is interposed between a front lens and a rear lens of the condenser unit.

13 Claims, 11 Drawing Sheets

FIG. 6A
FIG. 6C
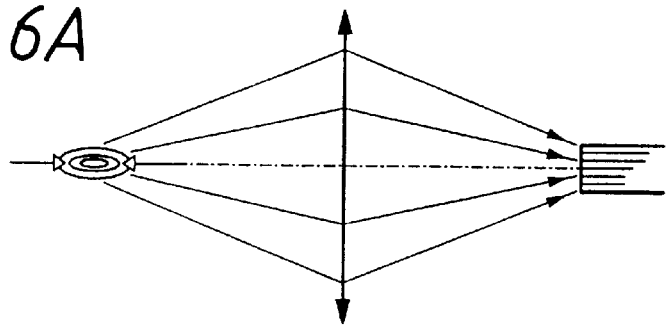
FIG. 6B
FIG. 6D
FIG. 7
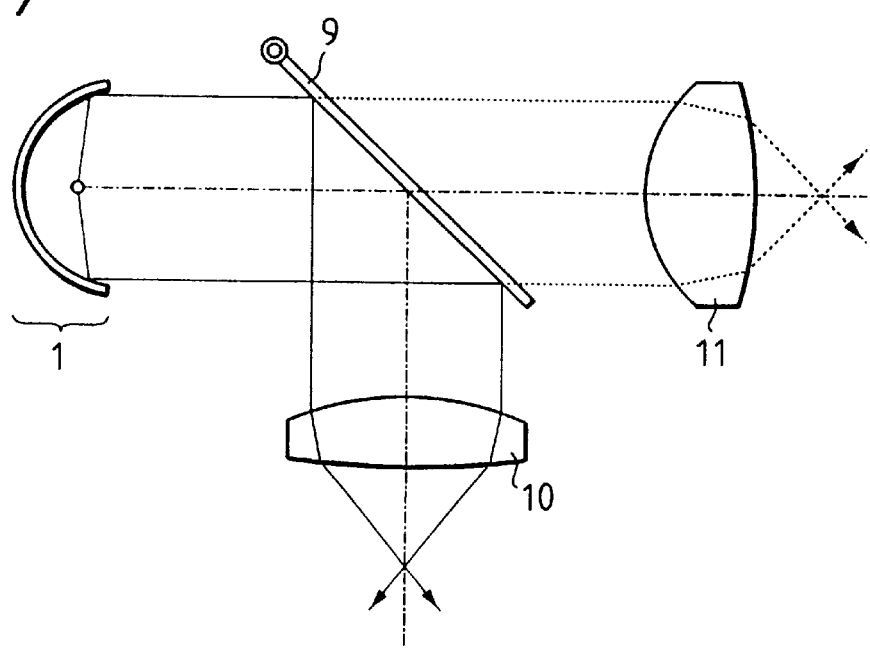

LIGHT SOURCE FOR ENDOSCOPES, HAVING DIFFERENT NUMERICAL-APERTURE LIGHT COLLECTION SYSTEM

This application is a Division of 08/854,944 May 14, 1997.

BACKGROUND OF THE INVENTION

1. Field of the Invention

This invention relates to a light source device for endoscopes which is compact in design, keeps a loss of the amount of light to a minimum, and affords low cost and small power consumption, and in particular, to a light source device for endoscopes which is used in an endoscope observation system and, even with use in an endoscope having a plurality of light guides of different numerical apertures, is capable of changing the numerical aperture of an incident light beam in accordance with the numerical apertures of the light guides.

2. Description of Related Art

Endoscopes at present are widely used in which internal organs are observed by inserting an elongation of the endoscope in the human body, and a treatment tool inserted in a channel therefor is used when necessary, to make various treatments.

Endoscopes are roughly divided into two classes: "fiberscopes" in which visual observation is made and "electronic scopes" in which a solid-state image sensor, such as a CCD (charge coupled device), Is used as image pick-up means. In particular, the latter endoscopes have been frequently used in recent years.

The illumination means of the endoscope is generally constructed with a light source device; a light guide for transmitting light supplied from the light source device to the distal end of the endoscope; and an illumination lens incorporated in the distal end of the endoscope, for spreading the light emerging from the light guide to radiate toward an object.

FIG. 1 shows an optical arrangement of a conventional light source device for endoscopes. This light source device includes a light source 1 emitting white light; filters 2 for selectively blocking rays having particular wavelengths of infrared and ultraviolet rays, of the white light emitted from the light source 1 (namely, total infrared blocking filters for removing infrared rays); a condenser lens system 3 for collecting beams of light transmitted through the filters 2; and a light guide 4 for receiving the light beams collected by the condenser lens system 3 into its entrance end to transmit them to its exit end. The optical system of this light source device is designed so that the image of the bright spot of a source lamp 1a is projected on the entrance end face of the light guide 4.

In general, a xenon lamp is frequently used for the light source 1 of the light source device for endoscopes of this type, and the source lamp 1a is constructed integral with a reflecting mirror 1b. The bright spot of the source lamp 1a is condensed at the position of the focal point of the reflecting mirror 1b so that reflected light by the reflecting mirror 1b becomes nearly parallel beams.

Illumination beams transmitted through the filters 2 are collected by the condenser lens system 3, and recently, for the purpose of compactly constructing the entire light source device for the purpose of reducing the manufacturing cost, a single lens in which at least one of its lens surfaces is configured to be aspherical has been chiefly used for the condenser lens system 3. It is for this reason that, in order to efficiently condense the illumination beams from the source lamp 1a through the condenser lens system 3 on the entrance end face of the light guide 4, an aspherical lens needs to be used to correct spherical aberration and coma. In this case, the aspherical lens has a convex surface of such a shape that the curvature is large in the vicinity of the optical axis of the lens and reduces progressively in separating from the optical axis.

For the illumination light source of the light source device for endoscopes, a halogen lamp, in addition to the xenon lamp, is used, and it is a common practice that the halogen lamp is constructed to be integral with an elliptical mirror. FIG. 2 shows the arrangement of such a light source device. Beams of light emitted from a halogen lamp 5a are condensed on the entrance end face of the light guide 4 by an elliptical mirror 5b, and thus the condenser lens system is dispensed with.

The xenon lamp of high luminance, however, is expensive in itself, and in general requires power consumption as high as 300 W, which is economically disadvantageous. Furthermore, a power supply for turning on the xenon lamp and a cooler are bulky. Hence, where the xenon lamp is used, the light source device for endoscopes also becomes large-sized and expensive.

On the other hand, because of the improvement of endoscope technology and the variety of application of the endoscope in recent years, the endoscope itself tends to a reduction in diameter. In keeping with this, the entrance end on the light source side of the light guide 4 also exhibits a tendency toward the reduction of diameter. In order to meet this situation, one lens surface of the con denser lens system 3 is provided with a high power to diminish the focal length as far as possible and a beam diameter on the condensing face is reduced so that a sufficient amount of light can be supplied to the light guide of reduced diameter.

However, with the developments of an endoscope apparatus and its manipulation, the following desires have recently been increased.

(1) When a 300 W xenon lamp of high luminance, which is high in cost and large in power consumption as stated above, is used in the light source device for endoscopes, it is very disadvantageous for the cost and power consumption of the device, and the device becomes large in size. Thus, a light source device for endoscopes is required which holds the brightness of illumination light usable even for the manipulation, affords low cost and small power consumption, and is compact in design. In order to fulfil these requirements, it is necessary to use an illumination lamp of low cost and small power consumption, such as a halogen lamp or a metal halide lamp.

(2) Recently, there is a growing tendency that the diameter of the insertion of the endoscope becomes small, and a light guide used in such an endoscope requires the diameter to be made smaller without decreasing the amount of transmission light. In order to satisfy this requirement, it becomes necessary to increase the numerical aperture of the light guide to improve the transmission capacity of light.

For point (1) mentioned above, however, the luminance of the halogen lamp is considerably lower than that of the xenon lamp, and thus it is difficult for the halogen lamp to bring about illumination light of brightness required for the manipulation. Moreover, in the halogen lamp, the efficiency of conversion of an input power into visible light is as low as 10%. Hence, a sufficient amount of light cannot be obtained. Further, since the remaining 90% is converted into heat, a large-sized, expensive cooler is required. In the case of the metal halide lamp, on the other hand, since the efficiency of conversion of the input power into visible light is high, a lamp of low rated power consumption is satisfactory and does not produce heat so copiously as cause trouble. As such, a small-sized, inexpensive cooler is used. However, the metal halide lamp is lower in luminance than the xenon lamp and is difficult to secure a fair amount of light.

As means for increasing the amount of light, it is considered that a lamp of high rated power consumption is used. In this case, however, the amount of emitted light is increased because the light emitting section of the lamp is enlarged, but that alone will not improve the luminance of the light emitting section. Thus, in the case where light is made incident from such a lamp on the light guide of small diameter, when a power supplied exceeds a certain value, little brightness is improved even though the power is made higher. In this way, an increase in rated power consumption of the lamp causes useless oversizing of the light source device and the cooler, which is unfavorable.

Consequently, in order to bring about the light source device for endoscopes which affords low cost and small power consumption and is compact in design, it is necessary that a lamp of small power consumption and low cost be used and light emitted from this lamp be made effectively incident on the light guide.

As for point (2), where the light guide of small numerical aperture which has been used in the past is used in the device in which the focal length of a condensing optical system is set so as to correspond to the light guide of larger numerical aperture, the amount of light incident on the light guide suffers a great loss.

In order to solve this problem, as set forth in Japanese Patent Preliminary Publication No. Hei 3-118509, it is known that the numerical aperture of emitted light of the condensing optical system can be changed in accordance with that of the light guide. However, that the optical system is constructed with a zoom system as the above means results in serious complication of the optical system, and causes an increase in the number of lenses and a loss of the amount of light as well. Furthermore, the entire length of the optical system is increased, and oversizing of the light source device itself is brought about.

The conventional device, as shown in FIG. 3, has met the problem in such a way that, in order to secure incident light of the numerical aperture most suitable for light guides of small and large numerical apertures, two light sources 1 are used to form separate optical paths, in which condenser lenses 3 and 3' are arranged. In this case, the use of two lamps causes oversizing of the entire light source and increases power consumption, resulting in false economy. Additionally, since the production of heat in the entire light source is increased, a large-sized cooler is required. As a consequence of this, the light source device is enlarged and becomes costly.

SUMMARY OF THE INVENTION

It is, therefore, a primary object of the present invention to provide a light source device for endoscopes which is compact in design, keeps the loss of the amount of light to a minimum, and affords low cost and small power consumption.

Another object of the present invention is to provide a light source device for endoscopes which is capable of changing the numerical aperture of a light beam incident on a light guide in accordance with the numerical aperture of the light guide of an endoscope used in an endoscope observation system.

In order to achieve these objects, according to one aspect of the present invention, the light source device for endoscopes includes, at least, a light source; a condenser lens unit for collecting light beams from the light source; a light guide for receiving the light beams collected through the condenser lens unit into its entrance end to transmit them to its exit end; and a reflecting mirror located on the opposite side of the condenser lens unit with respect to the light source. The light source device is designed so that a position where the light beams emitted from the light source are collected directly through the condenser lens unit does not coincide with a position where the light beams emitted from the light source and reflected back to the light source by the reflecting mirror are collected through the condenser lens unit.

According to another aspect of the present invention, the light source device for endoscopes includes, at least, a light source of arc discharge type; a condenser lens unit for collecting light beams from the light source; a light guide for receiving the light beams collected through the condenser lens unit into its entrance end to transmit them to its exit end; and a reflecting mirror located on the opposite side of the condenser lens unit with respect to the light source. The light source device is designed so that the arc axis of the light source is nearly parallel with the optical axis of the condenser lens unit.

According to still another aspect of the present invention, the light source device for endoscopes includes, at least, a light source; a condenser lens unit for collecting light beams from the light source; a light guide for receiving the light beams collected through the condenser lens unit into its entrance end to transmit them to its exit end; and a reflecting mirror located on the opposite side of the condenser lens unit with respect to the light source. The light source device is designed so that the light beams emitted from the light source are collected on the entrance end face of the light guide through each of plurality of independent optical paths in which condenser lens units of different numerical apertures are arranged.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 6A is a view for explaining an image formed on the entrance end face of a light guide where the arc axis of the metal halide lamp for alternating-current lighting is projected parallel to the optical axis;

FIG. 6B is a view for explaining an image formed on the entrance end face of a light guide where the arc axis of the metal halide lamp for alternating-current lighting is projected perpendicular to the optical axis;

FIGS. 6C and 6D are views showing condensed spot images formed on the entrance end faces of the light guides in FIGS. 6A and 6B, respectively;

FIG. 7 is a view for explaining another general arrangement of the light source device for endoscopes according to the present invention;

DETAILED DESCRIPTION OF THE PREFERRED EMBODIMENTS

Figure 1:
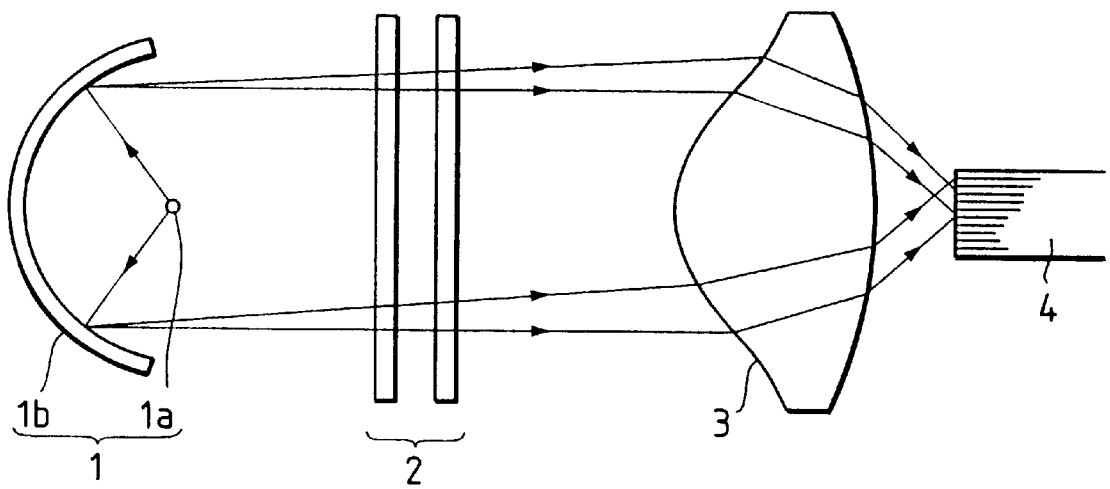
FIG. 1 is a schematic view showing an example of a conventional light source device for endoscopes.
Figure 2:
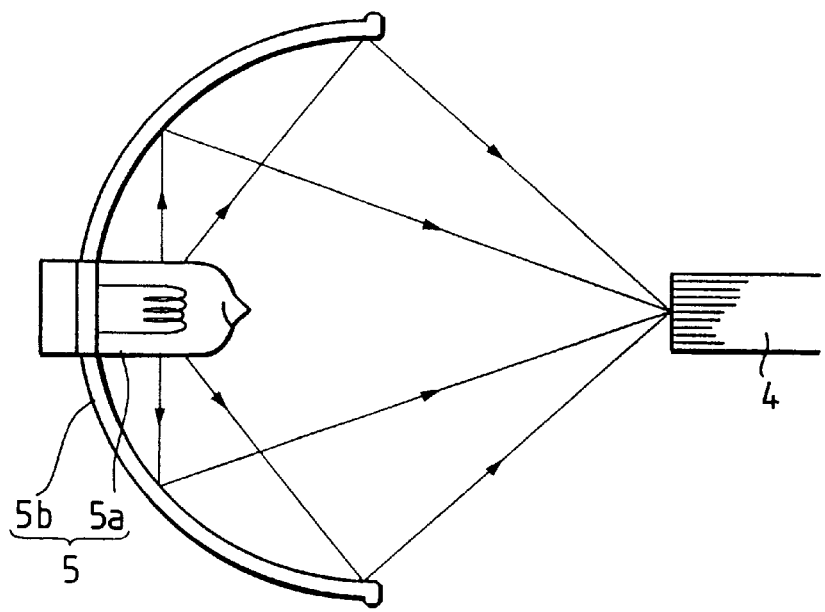
FIG. 2 is a schematic view showing another example of the conventional light source device for endoscopes.
Figure 3:
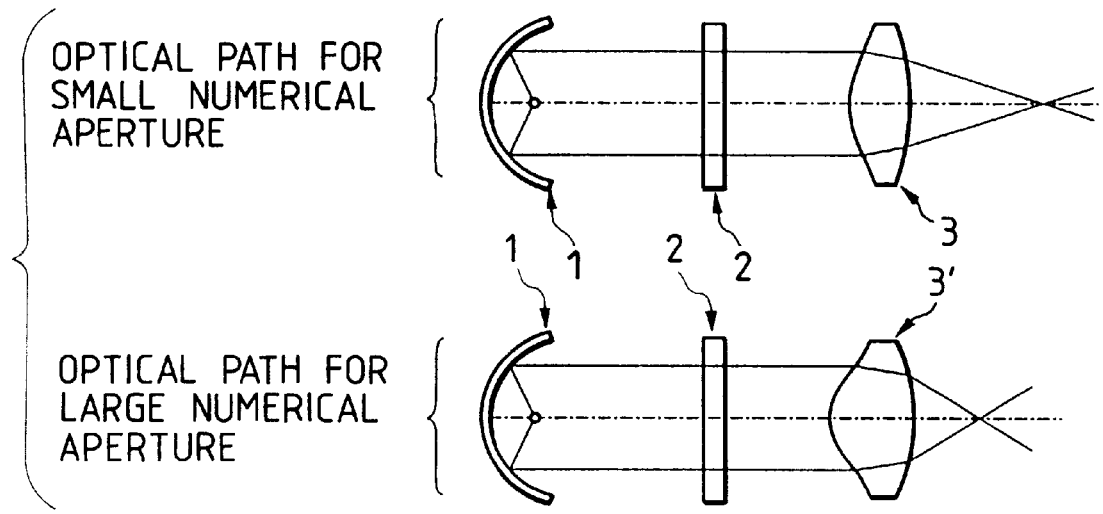
FIG. 3 is a schematic view showing still another example of the conventional light source device for endoscopes.

First of all, a description is given of the light source device for endoscopes using a lamp of filament emission type, such as a halogen lamp. In this light source device, as already mentioned in reference to FIG. 2, the halogen lamp and the elliptical mirror are integrally constructed. In this case, the elliptical mirror 5b is provided with a hole, in which the halogen lamp 5a is mounted, and thus reflected light is not produced from this mounting portion. Consequently, the light source device using the halogen lamp constructed integral with the reflecting mirror brings about a state of uneven distribution of light that the amount of light is small at the center of an illumination field, and has a serious defect in that not only is distribution light deteriorated, but also a loss in the amount of light is caused.

Thus, in order to effectively use light from the source lamp, a technique is known that light emitted in the opposite direction of a normal optical path is reflected by means of a spherical mirror, with its practical center of curvature at the light emitting section of the source lamp, and thereby the reflected light by the reflecting mirror is added to light emitted directly from the source lamp to enter the entrance end of the light guide. However, the use of the lamp of filament emission type for the source lamp, because its filament portion blocks most of the light reflected back by the spherical mirror, is not favorable in view of the effective use of source light.

Figure 4:
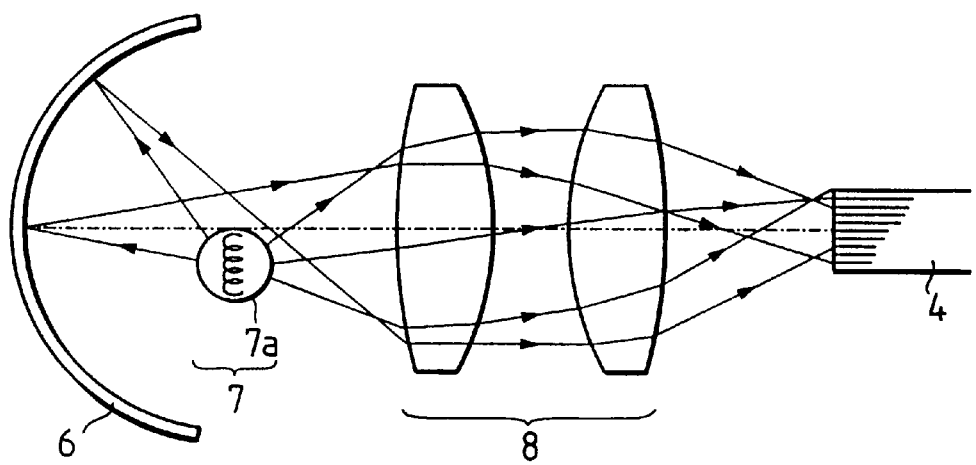
FIG. 4 is a view for explaining a general arrangement of the light source device for endoscopes according to the present invention.

Hence, in order to meet the shortage of luminance of the halogen lamp as well, it is necessary to remove causes leading to the loss of the amount of light, such as the uneven distribution of light. In order to prevent the uneven distribution of light, as shown in FIG. 4, it is only necessary that a position where light (direct light) emitted from a filament portion 7a of a light source 7 is condensed on the entrance end face of the light guide 4 through a condenser lens unit 8 (composed of two lens elements) is shifted from a position where reflected light by a spherical mirror 6, emitted from the filament portion 7, without being blocked by the filament portion 7a of the light source 7, is condensed on the entrance end face of the light guide 4 through the condenser lens unit 8. Specifically, the direct light and the reflected light are condensed at positions symmetrical with respect to the optical axis on the entrance end face of the light guide 4. By doing so, the direct light and the reflected light are not incident at the same position, and thus, although the luminance relative to each light is not increased, the size of a light spot at each condensing position is practically doubled to bring about the same effect as the case where the filament portion is about twice as large.

With the above arrangement, for example, the same amount of light as the case where a 130 W lamp is used to emit light corresponding to a power of 300 W can be secured on the end face of the light guide, without the loss of the amount of light attributable to the uneven distribution of light. In this way, if the light guide used has some extent of diameter, illumination light of sufficient brightness usable for manipulation can be obtained. Since in this case the power consumption is 150 W, the generation of unnecessary heat is minimized, and compact design and cost reduction of the light source device and the cooler can be realized. Moreover, compactness of the entire light source device can be intended.

In the light source device for endoscopes of the present invention, where the halogen lamp is used as the illumination light source, it is desirable to satisfy the following condition:

$$0.8 < \sin\{\tan^{-1}(2 f_1/D_1)\}/NA_{LS} < 1.2 \quad (1)$$

where $f_1$ is the focal length of the rear lens of the condenser lens unit, $D_1$ is the outer diameter of the rear lens of the condenser lens unit, and $NA_{LS}$ is the numerical aperture of the light guide.

In this case, when the outer diameter of the reflecting mirror of the light source is represented by $D_0$ and the space between the light source and the reflecting mirror is represented by $d_0$, it is also desirable to satisfy the following condition:

$$0.8 < \{D_0/(2\ d_0)\}/NA_{LS} < 1.2 \quad (2)$$

On the other hand, metal halide lamps are available in direct-current lighting and alternating-current lighting types.

Figure 5A:
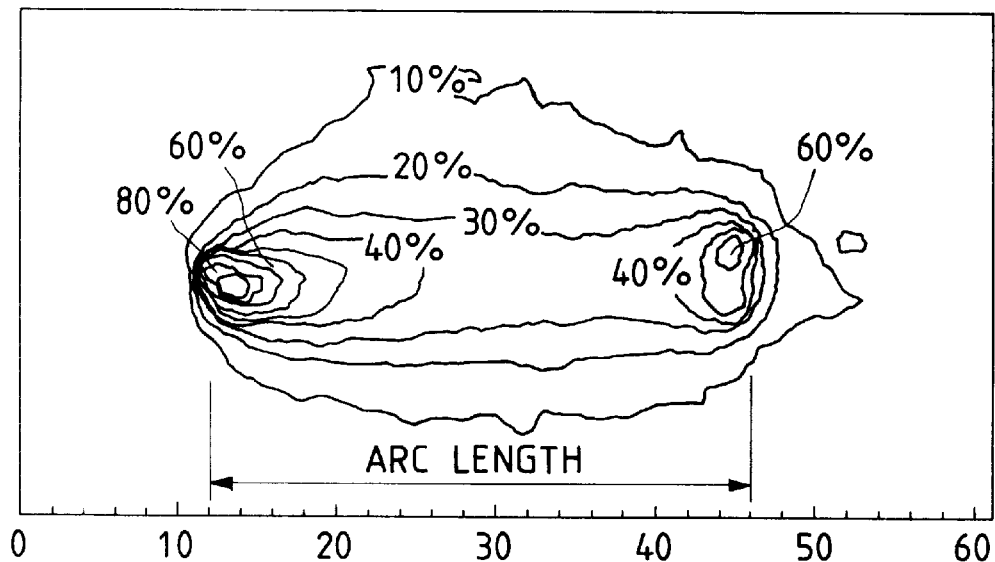
FIGS. 5A and 5B are views showing luminance distributions of arc portions of metal halide lamps.
Figure 5B:
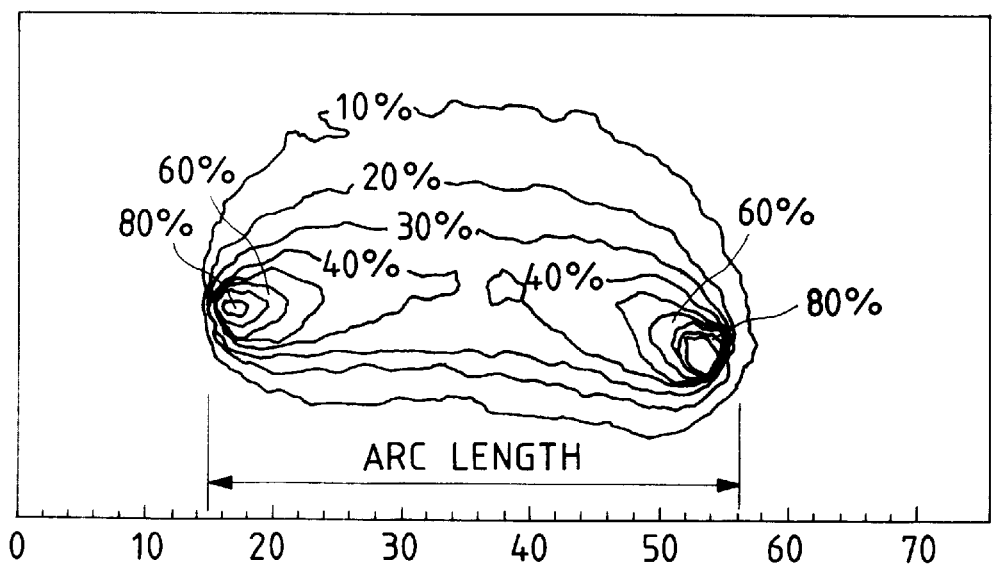

FIG. 5A shows a luminance distribution where the direct-current lighting lamp is used, and FIG. 5B shows a luminance distribution where the alternating-current lighting lamp is used. From these figures, it is seen that there is a difference in luminance distribution between both, but in either case, a luminance distribution of long elliptical form is produced along an arc axis.

In the case of a lamp of arc discharge type, gas is generated in the space between light emitting sections and light is not blocked by the light emitting sections. Thus, in FIGS. 6A and 6B, the amount of light which is emitted from the arc portion and projected as an image through the optical system is almost the same. However, the projected image where the arc axis is set parallel to the optical system as shown in FIG. 6A is smaller than the case where it is normal to the optical axis as shown in FIG. 6B (see FIGS. 6C and 6D). It is found from this that the case of FIG. 6A is higher in luminance than that of FIG. 6B.

Hence, when the metal halide lamp is used as the illumination light source, the arc axis Is set nearly parallel to the optical axis and thereby light can be condensed on the end face of the light guide at a high efficiency. This is particularly effective for a light guide of small diameter. Furthermore, when the metal halide lamp is used in combination with the reflecting mirror, the luminance can be improved. The light emitted in the opposite direction of the normal optical path, as shown in FIG. 4, is reflected back to the lamp side by the spherical mirror. However, the metal halide lamp, unlike the halogen lamp, has no filament, and thus even though the position to which the reflected light by the spherical mirror is returned is not shifted, but it is practically returned to the original arc position, the reflected light will not be blocked by the filament. Thus, since the direct light and the reflected light are incident at almost the same position on the end face of the light guide, the light beams are superposed to increase the luminance, and it becomes possible to secure the amount of light which maintains substantially the same level as in the conventional light source device for endoscopes using a xenon lamp of high luminance as the illumination light source.

In the metal halide lamp, since as mentioned above the efficiency of conversion of the input power into visible light is high, the power consumption of a lamp for securing the amount of light is as low as about 40 W, and a small-sized, inexpensive light source device is satisfactory. Moreover, since little heat is produced, a small, low cost cooler is required, and the entire light source device can be compactly constructed at low cost.

Where the metal halide lamp is used as the illumination light source, it is desirable that the light source device for endoscopes of the present invention satisfies the following condition in addition to Eqs. (1) and (2):

$$\beta_1 \, Da/D_L > 1 \quad (3)$$

where $\beta_1$ is the projecting magnification of the condenser lens unit, Da is the arc length of the source lamp, and $D_L$ is the diameter of the light guide.

As illustrated In FIG. 7, the light source device for endoscopes can be provided in which beams of light from the illumination light source 1 are condensed on the entrance end face of the light guide, by using a switching mirror 9, through each of independent optical paths in which at least two condenser lens units 10 and 11 of different numerical apertures are arranged, to thereby accommodate a light guide of large numerical aperture as well as a light guide of small numerical aperture having been used in the past. Thus, in the endoscope observation system using a light guide of large numerical aperture, illumination light of a brightness required for manipulation is ensured, and at the same time, an endoscope of smaller diameter than in the conventional endoscope can be used.

Additionally, even In the endoscope observation system with a light guide with small numerical aperture that has been used in the past, according to the light source device of the present invention, a sufficient brightness of illumination light can be ensured. Also, in the light source device of the present invention, a complicated zoom mechanism and a plurality of illumination light sources are not used, and thus cost and power reductions and compactness of the entire device can be obtained.

In accordance with the embodiments shown in the drawings, the present invention will be explained in detail below.

First Embodiment

Figure 8:
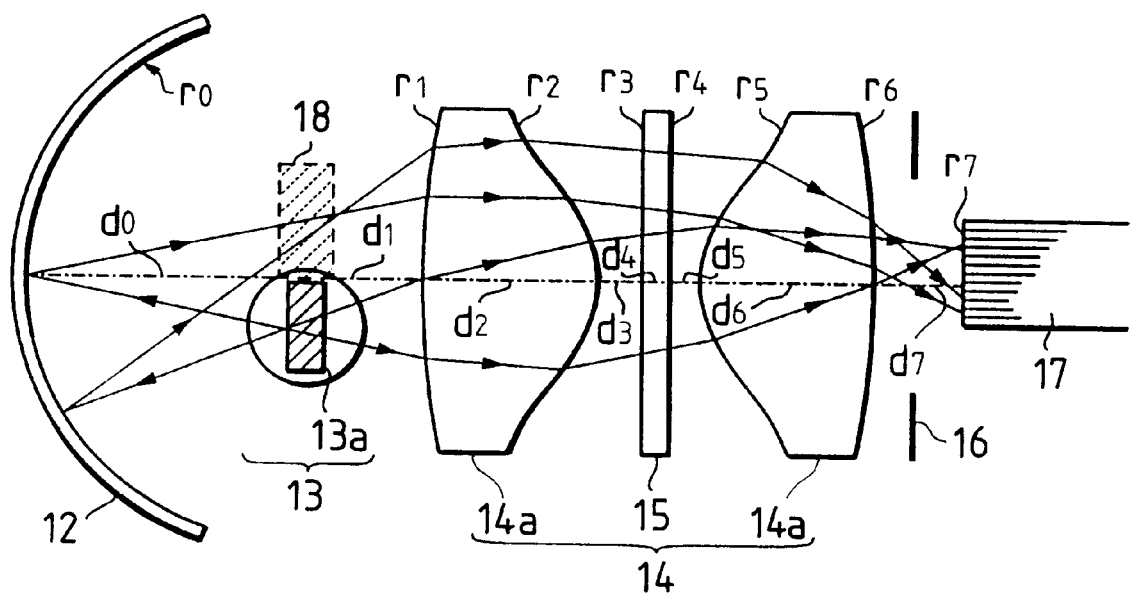
FIG. 8 is a sectional view, developed along the optical axis, showing the arrangement of the light source device for endoscopes of a first embodiment in the present invention.

The light source device for endoscopes of this embodiment uses a halogen lamp as the illumination light source. In the light source device of the first embodiment, as shown in FIG. 8, beams of light emitted from a halogen lamp 13 are condensed directly on the entrance end face of a light guide 17 through a condenser lens unit 14 (These light beams are hereinafter referred to as direct light). The halogen lamp 13 is located at a position shifted from the optical axis, and the position of condensed light is also somewhat shifted from the center of the entrance end face of the light guide 17 (Specifically, in the figure, the light is condensed at a position in a direction normal to the optical axis on the entrance end face of the light guide 17). The condenser lens unit 14 is composed of two identical lenses 14a1, 14a2 one side of each lens 14a assumes such an aspherical shape that curvature is large in the vicinity of the optical axis and reduces progressively in separating from the optical axis. Thus, by using the lenses 14a1, 14a2, spherical aberration and coma can be favorably corrected. Between the two lenses 14a1, 14a2 is interposed an infrared removing filter 15, which eliminates infrared rays emitted from the halogen lamp 13 and prevents the entrance end face of the light guide 17 from burning. A stop mechanism 16 for adjusting the amount of light incident on the light guide 17 is placed between the condenser lens unit 14 and the light guide 17.

On the other hand, beams of light emitted from the halogen lamp 13 in the opposite direction of the condenser lens unit 14 are reflected by a spherical mirror 12 (The beams are hereinafter referred to as reflected light). The spherical mirror 12 is spherical, with its center of curvature at a point of intersection of the halogen lamp 13 with the optical axis, and the reflected light by the spherical mirror 12 forms an image 18. The Image 18 and a filament portion 13a of the halogen lamp 13 are located symmetrically about the optical axis. The light from the image 18 is condensed through the condenser lens unit 14 on the entrance end face of the light guide 17.

The condenser lens unit 14 used in the light source device of the first embodiment, as mentioned above, is composed of two identical lenses. Further, the filament portion 13a is practically located at the object focal point of the front lens 14a1, while the entrance end of the light guide 17 is practically located at the image focal point of the rear lens 14a2. Consequently, an afocal system is formed between the front and rear lenses of the condenser lens unit 14, and the filament portion 13a is projected on the end face of the light guide 17 at a magnification of approximate 1×.

Figure 9:
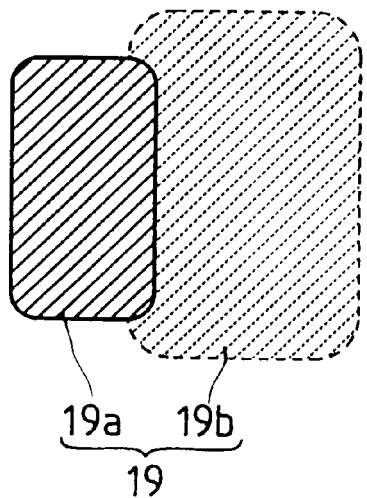
FIG. 9 is a view for explaining a state of a condensed spot formed on the entrance end face of the light guide in the light source device for endoscopes of FIG. 8.

In this way, the direct light and the reflected light, as shown in FIG. 9, forms condensed spot components 19a and 19b, respectively, on the entrance end face of the light guide 17. The filament portion 13a of the halogen lamp 13 and the image 18, as mentioned above, are symmetrical about the optical axis, and thus the condensed spot components 19a and 19b are located symmetrically with respect to the optical axis on the entrance face of the light guide 17. Since the spot component 19a formed by the direct light and the spot component 19b by the reflected light constitute a spot 19 without being incident at the same position, the spot 19 at the condensing position is about twice as large as that formed by the direct light alone, a fact which brings about the same effect as in the case where the size of the filament portion is practically doubled.

Figure 10:
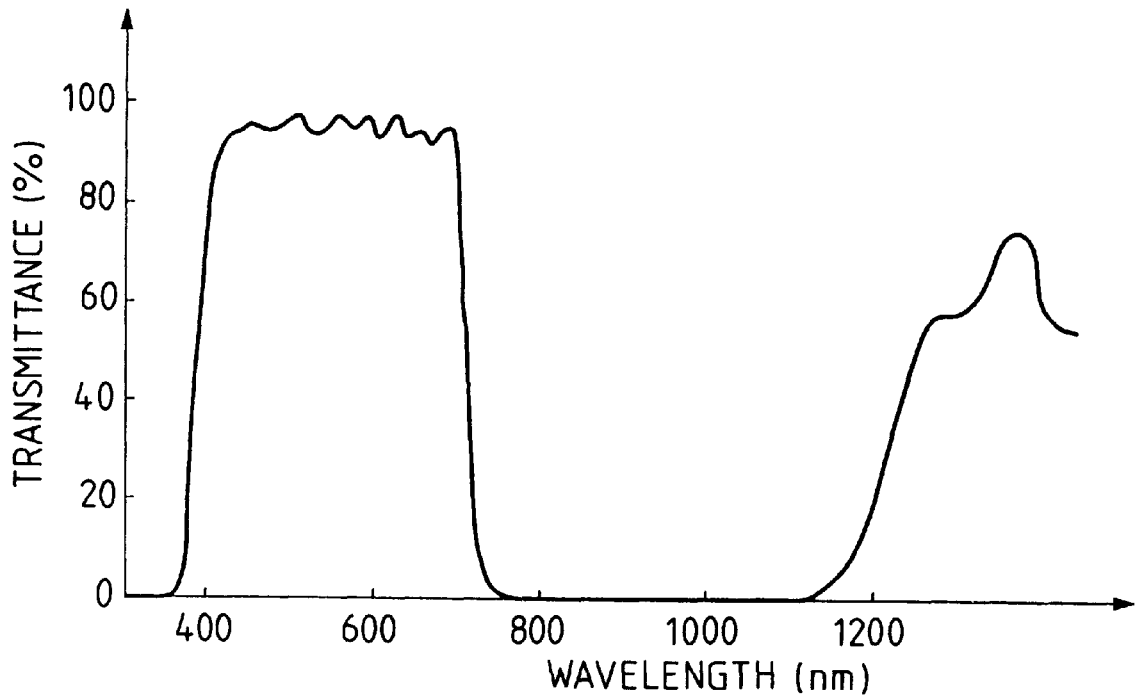
FIG. 10 is a graph showing the characteristics of spectral transmittance of an infrared removing filter used in the light source device for endoscopes of the first embodiment.

The infrared removing filter 15 used in the light source device of the first embodiment is of an interference film type, and its spectral transmittance characteristics are as shown in FIG. 10. Where a xenon lamp is used as the light source, infrared rays must be almost perfectly removed to prevent the burning of the end face of the light guide. Where a halogen lamp is used, by contrast, infrared rays need not be perfectly removed because its luminance is not very high. If it is intended for the infrared rays to be perfectly eliminated, for example, an infrared absorbing filter needs to be used, resulting in a great loss of visible light. Moreover, if it Is intended for the infrared rays to be removed over the entire region by a filter of interference film type, the filter becomes fairly expensive.

Thus, when a halogen lamp is used for the light source, it is only necessary that the cut-off wavelength region of the infrared removing filter used covers the range of at least 750–1100 nm. This is because the halogen lamp has its maximum spectral intensity In the vicinity of a wavelength of 900 nm, in which the highest spectral intensity distribution is produced and the effect of the lamp on burning of the light guide becomes greatest.

Figure 11:
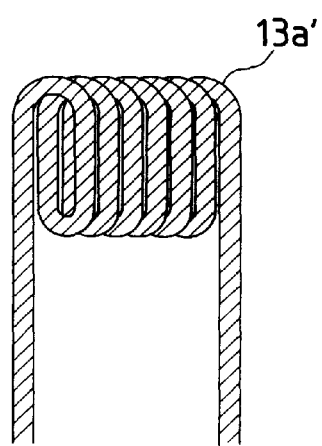
FIG. 11 is a view showing the structure of the filament of a halogen lamp used in the light source device for endoscopes of FIG. 8.

The halogen lamp used in the light source device of the first embodiment, as shown in FIG. 11, has a filament 13a', which has little space between adjacent wires. By providing the filament of such a shape, the luminance of the light emitting section can be maximized from a macroscopic viewpoint.

The numerical aperture of the light guide 17 used in the light source device of the first embodiment is 0.66, and both the lens 14a and the spherical mirror 12 are constructed so that the light beam can be made efficiently incident on the light guide 17 of this numerical aperture. Specifically, the value of the paraxial relation between the focal length $f_1$ and the outer diameter $D_1$ of the lens 14a, sin $\{\tan^{-1}(2 f_1/D_1)\}$, is about 0.74, which is nearly equal to the numerical aperture of the light guide 17. Further, the value of the paraxial relation between the space $d_0$ between the spherical mirror 12 and the filament portion 13a and the outer diameter $D_0$ of the spherical mirror 12, $D_0/(2 d_0)$, is approximately 0.75, which is also nearly equal to the numerical aperture of the light guide 17.

Also, if the value of each of these relations is set within 0.8–1.2 times the numerical aperture of the light guide 17, the light beam can be made incident on the light guide 17 at a high efficiency.

As stated above, the condenser lens unit 14 used in the first embodiment is matched with the numerical aperture of the light guide 17, and it is possible to make the light beam efficiently incident on the light guide 17. Furthermore, since the loss of the amount of light attributable to the uneven light distribution is not caused and the luminance of the filament portion is maximized, the light source device for endoscopes can be realized which supplies considerably bright illumination light, compared with the conventional device using the halogen lamp.

Additionally, in the condenser lens unit used in the first embodiment, the direct light and the reflected light from the filament portion are effectively used, and thereby the amount of light about twice the original rated power consumption of the lamp can be collected on the end face of the light guide, and the power consumption and the production of heat of the source lamp can be suppressed. Thus, the light source device for endoscopes which is low in cost and compact in design can be provided.

The numerical data of optical elements constituting the light source device for endoscopes of the first embodiment are shown below.

$f_1$=21.756, $D_0$=60, $D_1$=40, $D_2$=40, $D_3$=40

$r_0$=40

$d_0$=40

$d_1$=11.37

$r_1$=32.05

$d_2$=21 $n_2$=1.529 $v_2$=58.49

$r_2\infty$ (aspherical)

$d_3$=2.8

$r_3=\infty$ $d_4$=3

$r_4=\infty$ $d_5$=2.5

$r_5=\infty$ (aspherical)

$d_6$=21 $n_6$=1.529 $v_6$=58.49

$r_6$=−32.05

$d_7$=10.38

$r_7=\infty$ (light guide 17)

Aspherical coefficients

Second surface

P=0

B=−3.6×10$^{-2}$, E=4.4557×10$^{-7}$;

F=2.4778×10$^{-8}$, G=1.1544×10$^{-10}$,

H=−7.086×10$^{-14}$, I=−8.9393×10$^{-17}$

Fifth surface

P=0

B=3.6×10$^{-2}$, E=−4.4557×10$^{-7}$,

F=−2.4778×10$^{-8}$, G=−1.1544×10$^{-10}$,

H=7.086×10$^{-14}$, I=8.9393×10$^{-17}$

The values of Eqs. (1) and (2) are as follows:

sin $\{\tan^{-1}(2 f_1/D_1)\}/NA_{LS}$=1.11

$\{D_0/(2 d_0)\}/NA_{LS}$=1.14

In the above numerical data, $f_1$ is the focal length of the lens 14a; $d_0$ is the space between the spherical mirror 12 and the halogen lamp 13; $d_1$, $d_2$, ... are spaces between the faces of individual optical elements; r0 is the radius of curvature of the spherical mirror 12; r1, r2, ... are radii of curvature of the faces of individual optical elements; n2 and n6 are refractive indices of individual optical elements; v2 and v6 are Abbe's numbers of individual optical elements; $D_0$ is the outer diameter of the spherical mirror 12; $D_1$ is the outer diameter of the front lens of the condenser lens unit 14; $D_2$ is the outer diameter of the infrared removing filter 15; and $D_3$ Is the outer diameter of the rear lens of the condenser lens unit 14.

The configuration of each of the above aspherical surfaces is given by the following equation:

$$X = \frac{Y^2/r}{1+\sqrt{1-P(Y/r)^2}} + BY^2 + EY^4 + FY^6 + GY^8 + HY^{10} + IY^{12}$$

where X is the coordinate in the direction of the optical axis, Y is the coordinate in the direction normal to the optical axis, P is a conic constant, and B, E, F, G, H, and I are aspherical coefficients of second, fourth, sixth, eighth, tenth, and twelfth orders, respectively.

Figure 12:
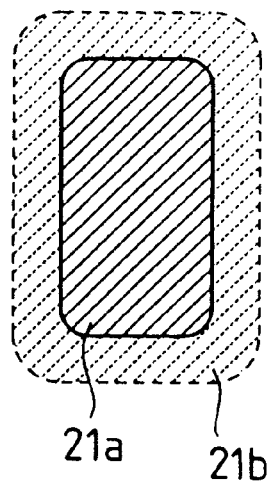
FIG. 12 is a view for explaining another state of the condensed spot formed on the entrance end face of the light guide in the light source device for endoscopes of FIG. 8.

In the case where the sectional area of the filament is somewhat smaller than the area of the end face of the light guide and the light incident on the entrance end face of the light guide becomes dark, it is rather efficient that the center of the filament portion 13a is located on the optical axis to make the light beam incident on the light guide 17. The condensed spot formed in this case is as shown in FIG. 12, In which a condensed spot component 21a by the direct light is formed at the center of the entrance end face of the light guide 17, while a condensed spot component 21b by the reflected light is formed in the periphery thereof. In this case, although the center part of the reflected light is blocked by the filament portion 13a, light reaching the periphery of the filament portion 13a is not blocked, just covering the whole of the filament portion 13a.

The light source device of the first embodiment, even when constructed as mentioned above, can use the halogen lamp of small power consumption to bring about the same effect as a halogen lamp of larger power consumption.

Figure 13:
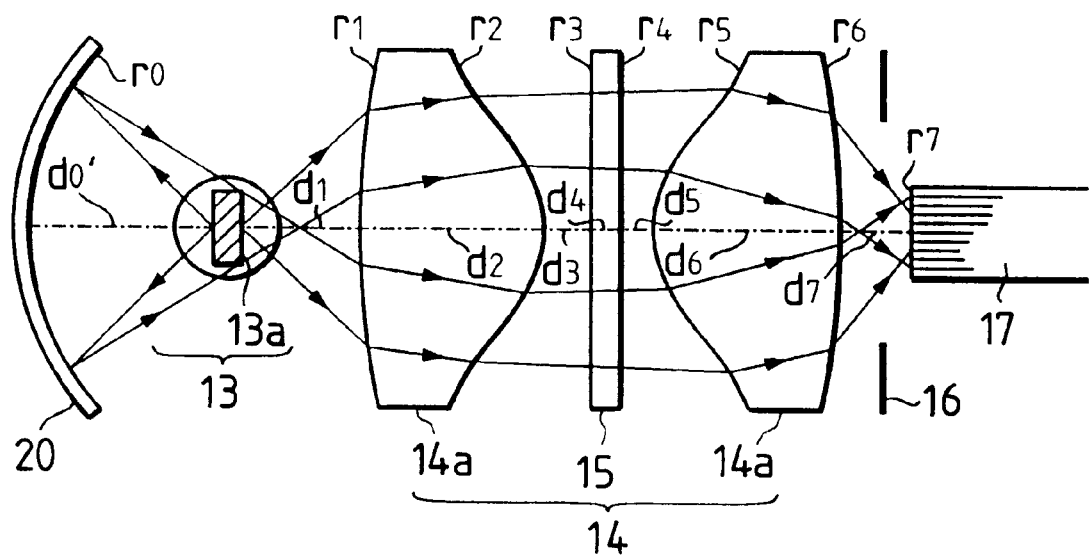
FIG. 13 is a sectional view, developed along the optical axis, showing the arrangement of a modified example of the light source device for endoscopes of the first embodiment.

For the light source device shown in FIG. 8, the spherical mirror 12 is somewhat large, and thus there is some difficulty for compact design. Thus, in FIG. 13 is shown an example where the outer diameter of the spherical mirror 12 is made smaller than that of the condenser lens unit 14 and thereby compactness of the device is obtained. The light source device shown in FIG. 13 is different from the device of FIG. 8 in the diameter of a spherical mirror 20 and the space between the spherical mirror 20 and the filament portion 13a. The spherical mirror 20 has the radius of curvature identical with the spherical mirror 12 of FIG. 8. For this reason, although the spherical mirror 20 does not have a perfect spherical surface with the filament portion 13a as a center of curvature, the value of the relation between a space $d_0'$ between the spherical mirror 20 and the filament portion 13a and an outer diameter $D_0'$ of the spherical mirror 20, $D_0'/(2 d_0')$, Is nearly 0.73. It is experimentally verified that the value of this relation is approximated to the numerical aperture (0.66) of the light guide 17, and thereby the center of curvature of the spherical mirror 20 is made to coincide virtually with the position of the filament portion 13a on the optical axis so that much the same amount of light as in the light source device of FIG. 8 can be made Incident on the light guide 17.

From the foregoing, with the light source device shown in FIG. 13, the compactness of the entire optical system in the device is intended and at the same time, illumination light of sufficient brightness can be supplied.

The following are the numerical data of optical elements constituting the light source device in FIG. 13. Also, the denotations of symbols in the data are the same as the above description.

$f_1$=21.756, $D_0$40 =35, $D_1$=40, $D_2$=40, $D_3$=40
$r_0$=40
$d_0'$=24
$d_1$=11.37
$r_1$=32.05
$d_2$=21 $n_2$=1.529 $v_2$=58.49
$r_2$=∞ (aspherical)
$d_3$=2.8
$r_3$=∞
$d_4$=3
$r_4$=∞
$d_5$=2.5
$r_5$=∞ (aspherical)
$d_6$=21 $n_6$=1.529 $v_6$=58.49
$r_6$=−32.05
$d_7$=10.38
$r_7$=∞ (light guide 17)
Aspherical coefficients
Second surface
P=0
B=−3.6×10$^{-2}$, E=4.4557×10$^{-7}$,
F=2.4778×10$^{-8}$, G=1.1544×10$^{-10}$,
H=−7.086×10$^{-14}$, I=−8.9393×10$^{-17}$
Fifth surface
P=0
B=3.6×10$^{-2}$, E=−4.4557×10$^{-7}$,
F=−2.4778×10$^{-8}$, G=−1.1544×10$^{-10}$,
H=7.086×10$^{-14}$, I=8.9393×10$^{-17}$.

The values of Eqs. (1) and (2) are as follows:
sin {tan$^{-1}$ (2 $f_1$/$D_1$)}/NA$_{LS}$=1.11
{$D_0'$/(2 $d_0'$)}/NA$_{LS}$=1.11

Figure 14:
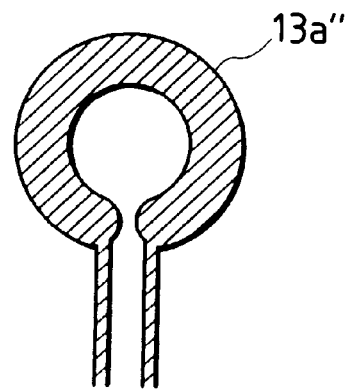
FIG. 14 is a view showing the structure of the filament of the halogen lamp used in the light source device for endoscopes of FIG. 13.

In the light source device shown in FIG. 13, if, as shown in FIG. 14, a filament 13a″ in which a hole is formed at the center is used, the reflected light by the spherical mirror will be conducted to the hole without being blocked by the filament portion, and thus the effect of a power over the original rated power consumption is brought about.

Figure 15A:
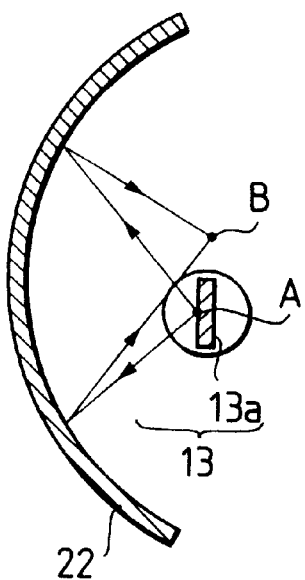
FIGS. 15A, 15B, and 15C are views showing other modified examples of the light source device for endoscopes of the first embodiment.

In the light source device shown in FIG. 8, instead of the spherical mirror 12, an elliptical mirror 22 such as that shown in FIG. 15A is used, and a first focal point A is set at the center of the filament portion 13a. Consequently, the performance of condensing to a second focal point B becomes high compared with the case where the spherical mirror 12 is used, and the efficiency of incidence on the end face of the light guide 17 can be much improved.

Figure 15B:
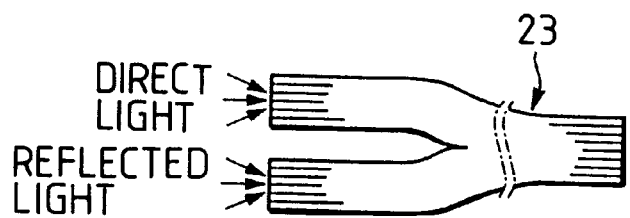
Figure 15C:
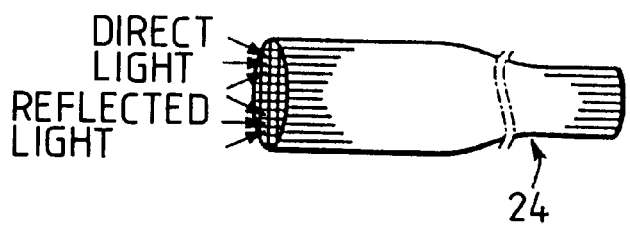

Furthermore, in the light source device of FIG. 8, in order to make the direct light and the reflected light incident more efficiently on the light guide, a forked light guide 23 shown in FIG. 15B is used to make the direct light and the reflected light separately incident, or a light guide 24 with an elliptical end face, shown in FIG. 15C, is employed. In this way, it becomes possible to increase the total amount of incident light on the light guide.

Second Embodiment

Figure 16:
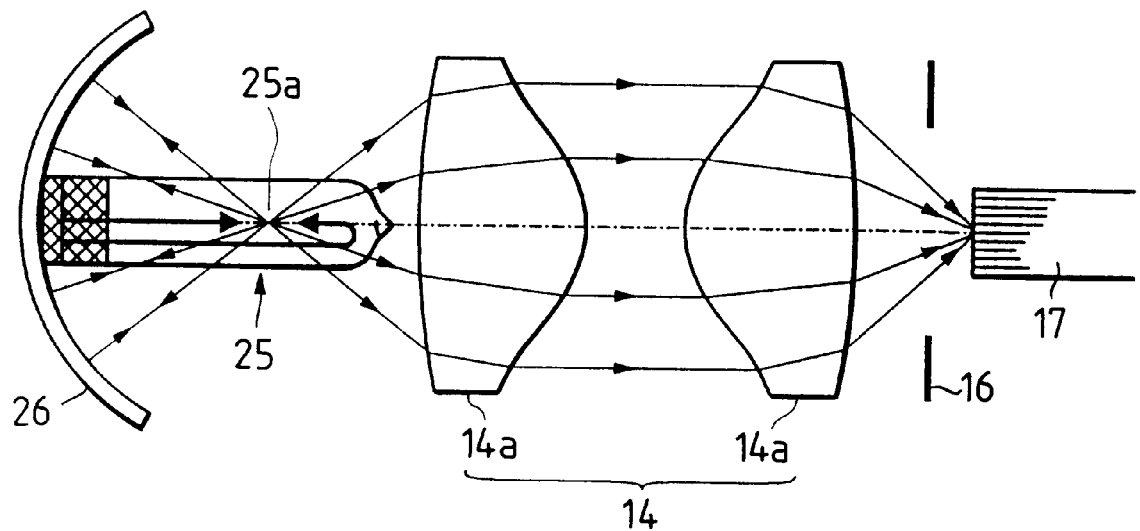
FIG. 16 is a sectional view, developed along the optical axis, showing the arrangement of the light source device for endoscopes of a second embodiment in the present invention.

The light source device of this embodiment, as shown in FIG. 16, uses a metal halide lamp 25 as the illumination light source. In the light source device of the second embodiment, the arrangement of the entire optical system including the condenser lens unit 14 is fundamentally identical with that of the first embodiment. Thus, the numerical data of optical elements is omitted here.

The values of Eqs. (1) and (2) in the second embodiment are as follows:
sin {tan$^{-1}$ (2 $f_1$/$D_1$)}/NA$_{LS}$=1.11
{$D_0$/(2 $d_0$)}/NA$_{LS}$=1.14

In the light source device of the second embodiment, as shown in FIG. 16, beams of light emitted from the metal halide lamp 25 are practically condensed on the entrance end face of the light guide 17 through the condenser lens unit 14 (These light beams are hereinafter referred to as direct light).

The stop mechanism 16 for adjusting the amount of incident light on the light guide 17 is interposed between the condenser lens unit 14 and the light guide 17. In the device of the first embodiment, the infrared removing filter is placed in the optical path, while in the second embodiment, which uses the metal halide lamp 25, there is little fear that infrared rays are emitted, and thus the infrared removing filter is dispensed with.

On the other hand, beams of light emitted from the metal halide lamp 25 in the opposite direction of the condenser lens unit 14 are reflected by a spherical mirror 26 (the beams are hereinafter referred to as reflected light), and are condensed on the entrance end face of the light guide 17 through the condenser lens unit 14. In this case, since the metal halide lamp 25 is of an arc discharge type, unlike the halogen lamp, the reflected light is not blocked by the light emitting section.

In the second embodiment, the spherical mirror 26 is constructed to be integral with the metal halide lamp 25 so that the center of curvature of the spherical mirror 26 and the center of an arc portion 25a of the metal halide lamp 25 are located on the optical axis. The direct light and the reflected light are thus incident at the same position and condensed on the entrance end face of the light guide 17. This substantially brings about the same effect as in the case where the luminance of the metal halide lamp 25 is practically doubled.

Moreover, the condenser lens unit 14 and the spherical mirror 26 used in the second embodiment, as in the first embodiment, are set to match with the numerical aperture of the light guide 17. In the second embodiment, the value of the paraxial relation $\sin\{\tan^{-1}(2 f_1/D_1)\}$ is about 0.7, while the value of the paraxial relation $D_0/(2 d_0)$ is about 0.65, and each of these values is approximated to the numerical aperture (0.66) of the light guide 17.

As mentioned above, the condenser lens unit 14 used in the second embodiment is matched with the numerical aperture of the light guide 17, and it becomes possible to make the light beam emitted from the metal halide lamp 25 efficiently incident on the entrance end face of the light guide 17. Since the device of the second embodiment is designed so that the characteristics of the metal halide lamp are utilized to maximize the luminance, it can supply bright illumination light of the same extent as in the conventional light source device using the xenon lamp. The use of the metal halide lamp, compared with the light source device using the xenon lamp, allows the realization of the light source device for endoscopes in which not only is the unit cost of the lamp low, but also its power consumption and heat generation are suppressed, and which is low in cost and small in size.

In the light source device of the second embodiment, since the center of the arc portion 25a of the metal halide lamp 25 and the center of curvature of the spherical mirror 26 are located on the optical axis, the arc axis of the metal halide lamp 25 becomes nearly parallel with the optical axis. In this case, however, the arc axis of the metal halide lamp 25 need not be accurately parallel with the optical axis, and if roughly parallel, the light beam can be efficiently condensed on the entrance end face of the light guide 17. Where an anode and an cathode constituting the arc portion 25a of the metal halide lamp 25 are large in diameter, the light beam is blocked by the anode and the cathode to bring about a state of the uneven light distribution. In this case, If the arc axis is slightly inclined with respect to the optical axis, the light beam can be made incident rather efficiently on the light guide.

The light source optical system of the second embodiment is particularly effective when the light guide 17 has a small diameter. However, where the diameter of the light guide is larger than the size of the condensed spot, it is rather effective when the arc axis of the metal halide lamp 25 is located normal to the optical axis because the light beam is not blocked by the anode and the cathode. Thus, whether the arc axis is set parallel or normal to the optical axis depends on the following. That is, calling again $\beta_1$ the projecting magnification of the condenser lens unit 14, Da the arc length of the lamp 25, and $D_L$ the diameter of the light guide 17, it is merely necessary that when $\beta_1 Da > D_L$, the arc axis is made parallel to the optical axis, while when $\beta_1 Da \leq D_L$, the arc axis is made normal to the optical axis. The second embodiment employs the metal halide lamp with an arc length of 3 mm, the light guide with an outer diameter of 2 mm, and the condenser lens unit with a projecting magnification of about 1× (and therefore the value of Eq. (3), $\beta_1 Da/D_L$, is 1.5). It is thus effective when the arc axis is set parallel to the optical axis.

Figure 17:
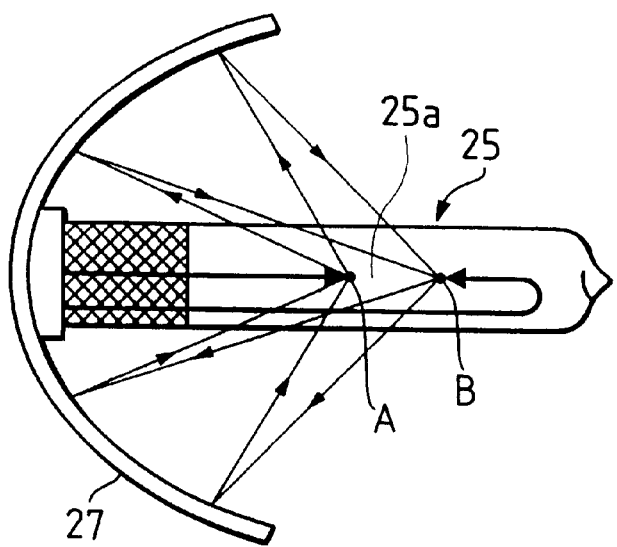
FIG. 17 is a view showing a modified example of a spherical mirror used in the light source device for endoscopes of the second embodiment.

The luminance distributions of the arc portion 25a of the metal halide lamp 25 are as shown in FIGS. 5A and 5B. Each of them is an intensity distribution of elliptical form produced along the arc axis, irrespective of an alternating- or direct-current lighting lamp, and has two high luminance points along the arc axis. In the second embodiment, the spherical mirror 26 with its center of curvature at the center of the arc portion is used, but as shown in FIG. 17, if an elliptical mirror 27 with the first and second focal points A and B at the two high luminance points is used, the efficiency of condensation of the reflected light in the arc portion 25a will be improved, thereby further increasing the amount of incident light on the light guide 17. Also, even where the elliptical mirror 27 is used, it is needless to say that if the value of the paraxial relation $D_0/(2 d_0)$ is set nearly equal to the numerical aperture of the light guide 17, the illuminance of illumination light supplied can be further improved.

Third Embodiment

Figure 18:
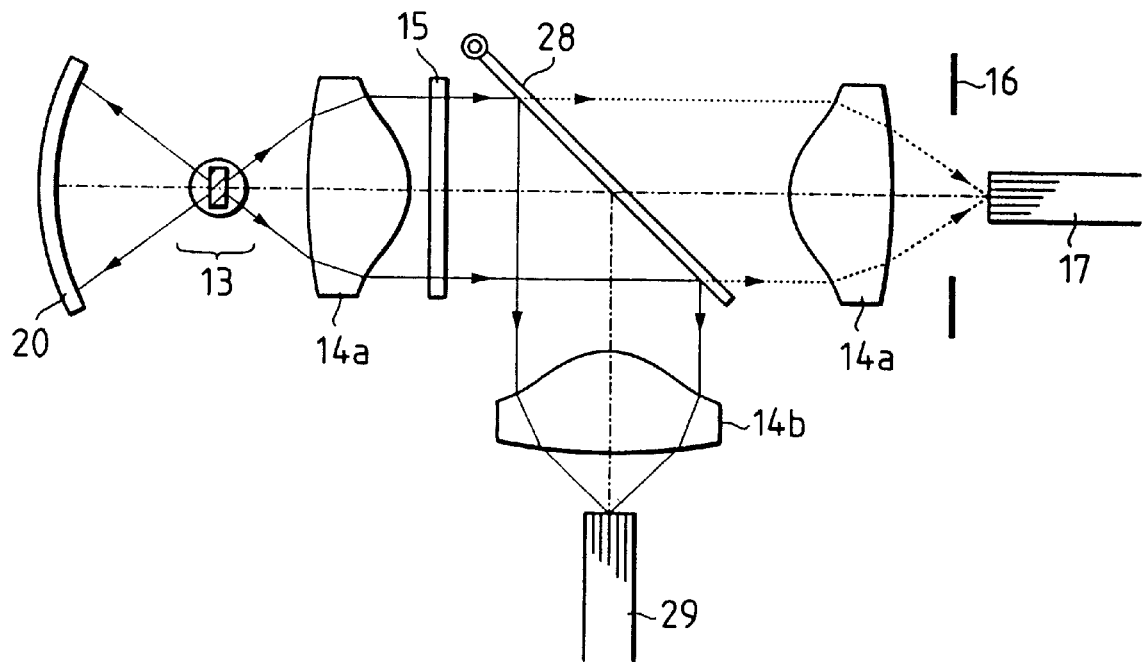
FIG. 18 is a sectional view, developed along the optical axis, showing the arrangement of the light source device for endoscopes of a third embodiment in the present invention.

In the light source device of this embodiment, at least two condenser lenses of different numerical apertures are arranged to make the light beam from the illumination light source incident on the entrance end face of the light guide through each of optical paths that are independently formed. The light source device of the third embodiment, as shown in FIG. 18, is such that the light beam emitted from the halogen lamp 13 is made nearly parallel by the front lens 14a1 and after passing through the infrared removing filter 15 and the rear lens 14a2, is condensed on the entrance end face of the light guide 17. Between the infrared removing filter 15 and the rear lens 14a2 is interposed a switching mirror 28, by which an optical path is switched to another to introduce the light beam into a lens 14b of different numerical aperture from each lens 14a1, 14a2 (In this case, the focal length of the lens 14b is shorter than that of the lens 14a1, 14a2).

The light source device of the third embodiment is designed to accommodate the conventional endoscope observation system using the light guide 17 of ordinary numerical aperture when the switching mirror 28 is removed from the optical path, and an endoscope observation system using a light guide 29 of larger numerical aperture when the switching mirror 28 is located in the optical path. Also, the numerical aperture of the light guide 29 in the third embodiment is 0.87.

In FIG. 18, which shows an example where the halogen lamp is used as the illumination light source, the fundamental arrangement of the optical system is the same as in the device of the first embodiment with the exception that the optical path is split. The optical system is constructed so that when the halogen lamp is used, the light beam is condensed most efficiently on the entrance end face of the light guide. Where the metal halide lamp is used, on the other hand, if the arrangement is made as in the device of the second embodiment, the light beam can be made incident efficiently on the entrance end face of the light guide, and the light source device for endoscopes can be provided which accommodates an endoscope having two light guides of different numerical apertures.

Also, although the present invention pertains to the light source device for endoscopes using an inexpensive lamp, such as a halogen lamp or metal halide lamp, the device of the third embodiment may use a xenon lamp constructed to be integral with a parabolic mirror which is in general used.

Figure 19:
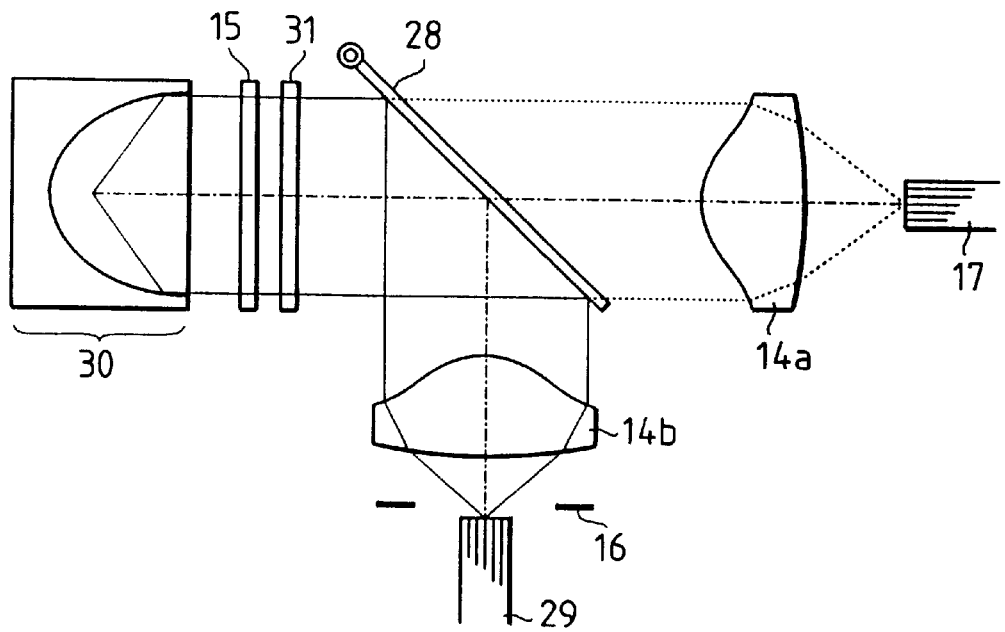
FIG. 19 is a sectional view, developed along the optical axis, showing the arrangement of a modified example of the light source device for endoscopes of the third embodiment.

FIG. 19 shows an example where the xenon lamp constructed integral with the parabolic mirror is used as the illumination light source. Since a light beam emitted from the lamp constructed to be integral with the parabolic mirror becomes nearly parallel, the front lens 14a used in the device of FIG. 18 is not necessary. The light beam emitted from a xenon lamp 30 constructed integral with the parabolic mirror thus enters the infrared removing filter 15. Passage of the light beam through the infrared removing filter 15 causes most of infrared rays to be eliminated, and as in the device of FIG. 18, the switching mirror 28 is located in the optical path when necessary, thereby efficiently condensing the light beam on the entrance end face of the light guide 29.

The infrared removing filter 15 used in the device of the third embodiment, as described in the first embodiment, is an interference film type filter capable of almost perfectly removing the light of wavelengths of at least 750–1100 nm. Where the xenon lamp of high luminance is employed, it is desirable that the infrared removing filter 15 is used in combination with an infrared absorbing filter 31 to eliminate the infrared rays over almost their entire region.

Figure 20:
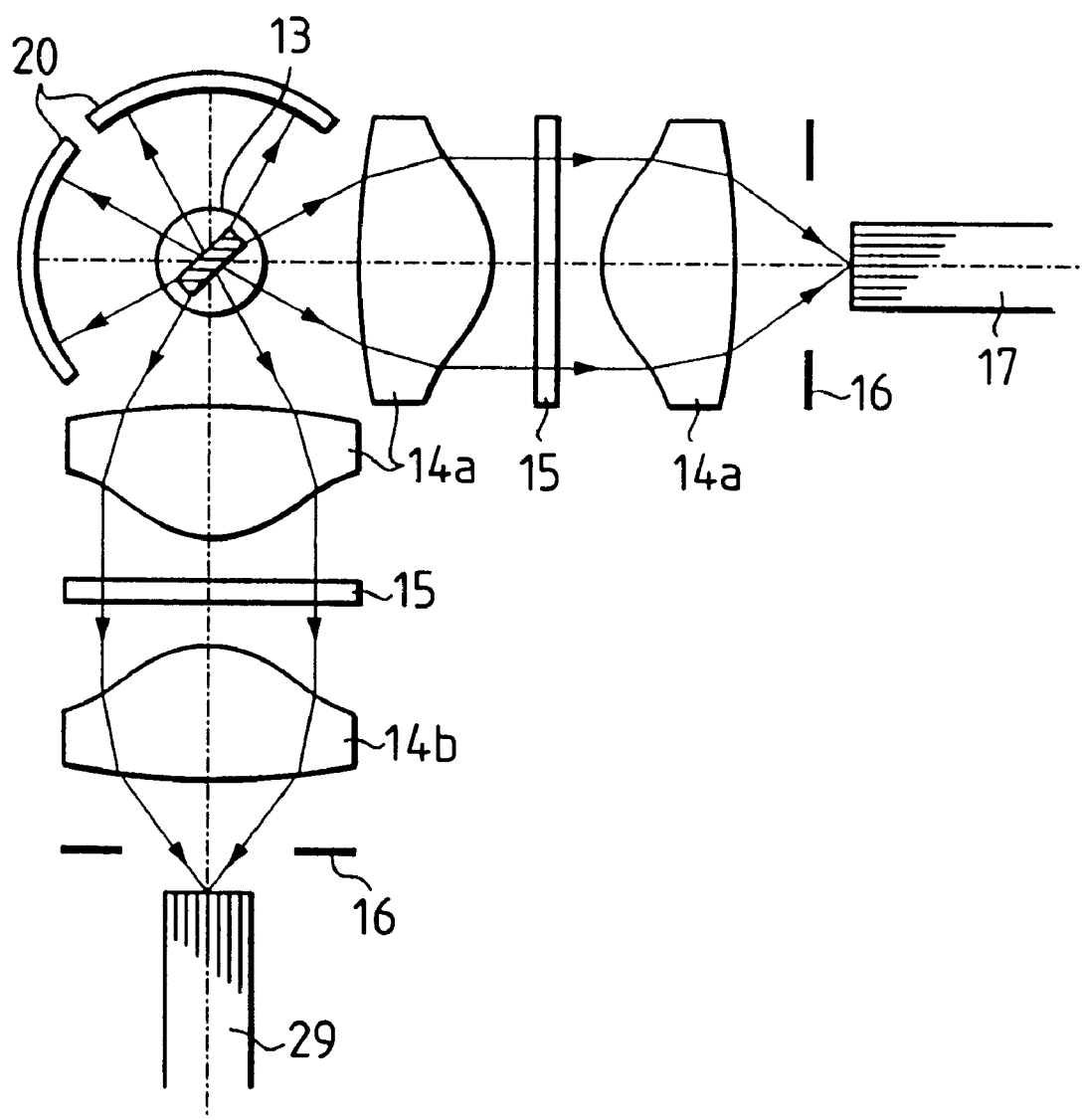
FIG. 20 is a sectional view, developed along the optical axis, showing the arrangement of another modified example of the light source device for endoscopes of the third embodiment.

The light source device of the third embodiment may be constructed as illustrated in FIG. 20, where a lens 14a3, which has the same lens data as the lenses 14a1, 14a2, is used as a front lens of the condenser lens unit that collects light on the light guide 29 The device given here is an example where light can be supplied to a plurality of light guides of different numerical apertures at the same time. In this figure, the halogen lamp is used as the illumination light source, but even when the metal halide lamp or xenon lamp is used, the same effect can be secured with the same arrangement.

What is claimed is:

1. A light source device for endoscopes comprising:
   a light source;
   a condenser lens unit constructed and arranged to collect light beams emitted from said light source;
   a light guide that receives said light beams collected through said condenser lens unit into an entrance end face thereof, wherein said light guide transmits said light beams to an exit end face thereof; and
   a reflecting mirror located on an opposite side of said condenser lens unit with respect to said light source,
   wherein light beams emitted from said light source are condensed at the entrance end face of said light guide through each of a plurality of independent optical paths in which a condenser lens unit of different numerical aperture is placed; and
   wherein a switching mirror is provided in an optical path in which said condenser lens unit is placed so that the light beams emitted from said light source are separated in two directions by said switching mirror.

2. A light source device for endoscopes according to claim 1, wherein said switching mirror is placed in a substantially afocal light beam.

3. A light source device for endoscopes comprising:
   a light source;
   a condenser lens unit constructed and arranged to collect light beams emitted from said light source;
   a light guide that receives said light beams collected through said condenser lens unit into an entrance end face thereof, wherein said light guide transmits said light beams to an exit end face thereof; and
   a reflecting mirror located on an opposite side of said condenser lens unit with respect to said light source,
   wherein a position where direct light beams that are emitted directly from said light source and converged through said condenser lens unit is shifted with respect to a position where reflected light beams that are emitted from said light source and re-converged through said condenser lens unit after being reflected back and converged in a vicinity of said light source by said reflecting mirror,
   wherein said condenser lens unit includes a front lens and a rear lens, said front lens and said rear lens constituting an afocal system, and
   wherein an infrared removing filter is interposed between said front lens and said rear lens of said condenser lens unit.

4. A light source device for endoscopes according to claim 3, wherein said infrared removing filter eliminates infrared rays with wavelengths of at least 750–1100 nm.

5. A light source device for endoscopes comprising:
   a light source of arc discharge type;
   a condenser lens unit constructed and arranged to collect light beams emitted from said light source;
   a light guide that receives said light beams collected through said condenser lens unit into an entrance end face thereof, wherein said light guide transmits said light beams to an exit end face thereof; and
   a reflecting mirror located on an opposite side of said condenser lens unit with respect to said light source,
   wherein an arc axis of said light source is substantially parallel to an optical axis of said condenser lens unit and
   wherein the following condition is satisfied:

$$\beta_1 D_a / D_L > 1$$

where $\beta_1$ is a projecting magnification of said condenser lens unit, $D_a$ is an arc length of a lamp of said light source, and $D_L$ is a diameter of said light guide.

6. A light source device for endoscopes comprising:
   a light source of arc discharge type:
   a condenser lens unit constructed and arranged to collect light beams emitted from said light source;
   a light guide that receives said light beams collected through said condenser lens unit into an entrance end face thereof, wherein said light guide transmits said light beams to an exit end face thereof; and
   a reflecting mirror located on an opposite side of said condenser lens unit with respect to said light source,
   wherein an arc axis of said light source is substantially parallel to an optical axis of said condenser lens unit, wherein said condenser lens unit includes a front lens and a rear lens, said front lens and said rear lens constituting an afocal system, and wherein an infrared removing filter is interposed between said front lens and said rear lens of said condenser lens unit.

7. A light source device for endoscopes according to claim 6, wherein said infrared removing filter eliminates infrared rays with wavelengths of at least 750–1100 nm.

8. A light source device for endoscopes comprising:

a light source;

a condenser lens unit constructed and arranged to collect light beams emitted from said light source:

a light guide that receives said light beams collected through said condenser lens unit into an entrance end face thereof, wherein said light guide transmits said light beams to an exit and face thereof; and a reflecting mirror located on an opposite side of said condenser lens unit with respect to said light source, wherein a position where direct light beams that are emitted directly from said light source and converged through said condenser lens unit is shifted with respect to a position where reflected light beams that are emitted from said light source and re-converged through said condenser lens unit after being reflected back and converged in a vicinity of said light source by said reflecting mirror, and wherein said light guide has a forked entrance and so that one of two entrance end faces receives the direct light beams that are emitted directly from said light source and converged through said condenser lens unit and that a remaining one of said two entrance end faces receives the reflected light beams that are emitted from said light source and re-converged through said condenser lens unit after being reflected back and converged in the vicinity of said light source by said reflecting mirror.

9. A light source device for endoscopes comprising:

a light source;

a condenser lens unit constructed and arranged to collect light beams emitted from said light source;

a light guide that receives said light beams collected through said condenser lens unit into an entrance end face thereof, wherein said light guide transmits said light beams to an exit end face thereof; and a reflecting mirror located on an opposite side of said condenser lens unit with respect to said light source, wherein a position where direct light beams that are emitted directly from said light source and converged through said condenser lens unit is shifted with respect to a position where reflected light beams that are emitted from said light source and re-converged through said condenser lens unit after being reflected back and converged in a vicinity of said light source by said reflecting mirror, and wherein the entrance end face of said light guide is shaped into an elliptical form.

10. A light source device for endoscopes comprising:

a light source, a condenser lens unit constructed and arranged to collect light beams emitted from said light source;

a light guide that receives said light beams collected through said condenser lens unit into an entrance end face thereof, wherein said light guide transmits said light beams to an exit end face thereof; and a reflecting mirror located on an opposite side of said condenser lens unit with respect to said light source, wherein light beams emitted from said light source are condensed at the entrance end face of said light guide through each of a plurality of independent optical paths in which a condenser lens unit of different numerical aperture is placed; and wherein the light beams are supplied to light guides of different numerical apertures at the same time.

11. A light source device for endoscopes comprising:

a light source of arc discharge type;

a condenser lens unit for collecting light beams emitted from said light source;

a light guide for receiving the light beams collected through said condenser lens unit into an entrance end face thereof to transmit the light beams to an exit end face thereof; and a reflecting mirror located on an opposite side of said condenser lens unit with respect to said light source, an arc axis of said light source being substantially parallel to an optical axis of said condenser lens unit, and said condenser lens unit including a front lens and a rear lens, said front lens and said rear lens constituting an afocal system.

12. A light source device for endoscopes comprising:

a light source of arc discharge type;

a condenser lens unit for collecting light beams emitted from said light source;

a light guide for receiving the light beams collected through said condenser lens unit into an entrance end face thereof to transmit the light beams to an exit end face thereof; and a reflecting mirror located on an opposite side of said condenser lens unit with respect to said light source, an arc axis of said light source being substantially parallel to an optical axis of said condenser lens unit, wherein the following condition is satisfied:

$$0.8 < \{D_0/(2\ d_0)\}/NA_{LS} < 1.2$$

where $D_0$ is an outer diameter of said reflecting mirror used for said condenser lens unit, $d_0$ is a space between said light source and said reflecting mirror, and $NA_{LS}$ is a numerical aperture of said light guide.

13. A light source device for endoscopes comprising:

a light source of arc discharge type;

a condenser lens unit for collecting light beams emitted from said light source;

a light guide for receiving the light beams collected through said condenser lens unit into an entrance end face thereof to transmit the light beams to an exit end face thereof; and a reflecting mirror located on an opposite side of said condenser lens unit with respect to said light source, an arc axis of said light source being substantially parallel to an optical axis of said condenser lens unit, and said reflecting mirror having a spherical form.

* * * * *

UNITED STATES PATENT AND TRADEMARK OFFICE
CERTIFICATE OF CORRECTION

PATENT NO. : 6,139,175
DATED : October 31, 2000
INVENTOR(S) : Tomioka et al.

It is certified that error appears in the above-identified patent and that said Letters Patent is hereby corrected as shown below:

Column 17,
Lines 17 and 28, change "and" to -- end --.

Column 18,
Delete lines 12-26.
After the line numbered 65, add claim 14:
-- 14. A light source devise for endoscopes comprising:
    a light source of arc discharge type,
    a condenser lens unit for collecting light beams emitted from said light source,
    a light guide for receiving the light beams collected through said condenser lens unit into a entrance end face thereof to transmit the light beams to an exit and face thereof; and
    a reflecting mirror located on an opposite side of said condenser lens unit with respect to said light source,
    an arc axis of said light source being substantially parallel to an optical axis of said condenser lens unit, and
    said reflecting mirror having an elliptical form. --

Signed and Sealed this

Ninth Day of October, 2001

Attest:

NICHOLAS P. GODICI
Attesting Officer    Acting Director of the United States Patent and Trademark Office